United States Patent
Dillinger et al.

(10) Patent No.: US 8,016,359 B2
(45) Date of Patent: Sep. 13, 2011

(54) VEHICLE ARMREST

(75) Inventors: Thomas Dillinger, Wermelskirchen (DE); David Collins, Basildon (GB)

(73) Assignee: Johnson Controls GmbH, Burscheid (DE)

( * ) Notice: Subject to any disclaimer, the term of this patent is extended or adjusted under 35 U.S.C. 154(b) by 1238 days.

(21) Appl. No.: 10/570,066

(22) PCT Filed: Sep. 2, 2004
(Under 37 CFR 1.47)

(86) PCT No.: PCT/EP2004/009747
§ 371 (c)(1),
(2), (4) Date: Feb. 23, 2007

(87) PCT Pub. No.: WO2005/023584
PCT Pub. Date: Mar. 17, 2005

(65) Prior Publication Data
US 2010/0253126 A1    Oct. 7, 2010

(30) Foreign Application Priority Data
Sep. 2, 2003  (DE) .................................. 103 40 797

(51) Int. Cl.
*B60N 2/46* (2006.01)
(52) U.S. Cl. ............................. 297/411.32; 297/411.38
(58) Field of Classification Search ............ 297/411.32, 297/411.38
See application file for complete search history.

(56) References Cited

U.S. PATENT DOCUMENTS

| 3,807,799 | A  | * | 4/1974 | Freedman ................ 297/411.32 |
| 3,909,063 | A  |   | 9/1975 | Bonisch et al. |
| 4,435,011 | A  | * | 3/1984 | Hakamata ............ 297/411.32 X |
| 4,848,840 | A  | * | 7/1989 | Toya ........................ 297/411.32 |
| 5,476,307 | A  | * | 12/1995 | Whalen ................ 297/411.32 X |
| 5,669,107 | A  | * | 9/1997 | Carlsen et al. ....... 297/411.32 X |
| 5,752,739 | A  |   | 5/1998 | Saeki |
| 5,941,603 | A  | * | 8/1999 | Wein .................... 297/411.32 X |
| 6,047,444 | A  | * | 4/2000 | Braun .................. 297/411.32 X |
| 6,209,960 | B1 | * | 4/2001 | Bradbury ............. 297/411.32 X |
| 6,238,002 | B1 | * | 5/2001 | Brewer et al. ............ 297/411.32 |
| 6,328,384 | B1 | * | 12/2001 | Yamauchi et al. ... 297/411.32 X |
| 6,471,297 | B1 | * | 10/2002 | Runde et al. ............. 297/411.32 |
| 2005/0200186 | A1 | * | 9/2005 | Schumacher et al. ... 297/411.38 |
| 2008/0315658 | A1 | * | 12/2008 | Knapp .................. 297/411.38 |

FOREIGN PATENT DOCUMENTS

| DE | 29 31 237 A1 | 2/1981 |
| DE | 30 36 302 A1 | 4/1982 |
| DE | 3414316 A1 | 10/1985 |
| DE | 35 05 399 A1 | 8/1986 |
| DE | 40 35 855 A1 | 5/1992 |
| DE | 198 11 525 A1 | 9/1999 |
| EP | 0 960 767 A2 | 12/1999 |

OTHER PUBLICATIONS

International Search Report for PCT/EP2004/009747, date of mailing Oct. 12, 2004, 3 pages.

* cited by examiner

*Primary Examiner* — Rodney B White
(74) *Attorney, Agent, or Firm* — Foley & Lardner LLP

(57) ABSTRACT

An armrest for a motor vehicle seat includes an armrest body configured to coupled to a fixing mechanism. The armrest body includes axle pins and stop pins and the fixing mechanism includes a pivot bearing and a stop groove. The axle pins are configured to insert into the pivot bearings and pivot about an axis of rotation. The distance between the stop pins is smaller than the distance between the pivot bearings.

14 Claims, 2 Drawing Sheets

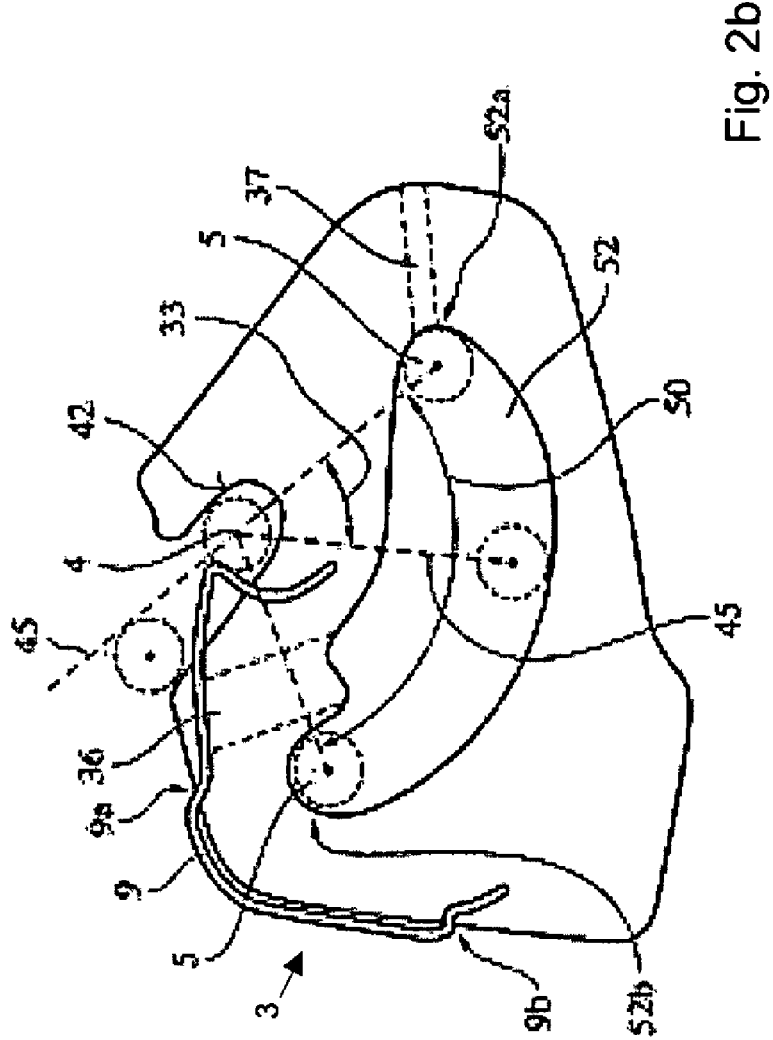
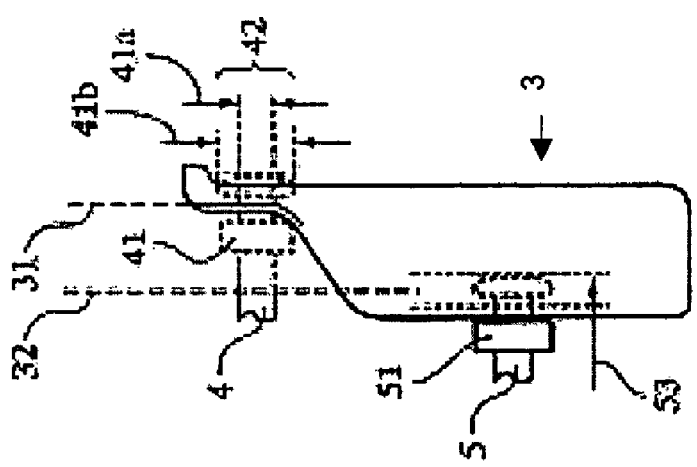
Fig. 2b
Fig. 2a

VEHICLE ARMREST

CROSS-REFERENCE TO RELATED PATENT APPLICATIONS

The present application is a National Stage of Application PCT/EP2004/009747 entitled, "Armrest, Especially for a Motor Vehicle, and Method" filed on Sep. 2, 2004 which published under PCT Article 21(2) on Mar. 17, 2005 as WO 2005/023584 A1 in the German language, which claims priority to German Patent Application No. DE 103 40 797.9 filed on Sep. 2, 2003, the disclosures of which are incorporated herein by reference in their entirety.

TECHNICAL FIELD

The application relates to an armrest for a motor vehicle.

BACKGROUND

The publication DE 198 11 523 discloses an armrest for a motor vehicle having an armrest body which has guide pins protruding on two sides and guided in a circular arc-shaped guide groove of the retaining device so that they can pivot about an axis of rotation. One disadvantage in this arrangement is that the armrest body, when it is installed, can be moved. Moreover, the armrest body must be aligned exclusively in the direction of the introducing grooves of the retaining device for fastening or installation. This increases the cost of installation. Furthermore, the risk of incorrect installation occurring, which further increases the costs, is increased in particular for the installation.

Accordingly, it would be beneficial to provide an armrest which can be produced in a simple and cost-effective manner and can be installed in a simple, cost-effective and more secure manner.

SUMMARY

In one exemplary embodiment, an armrest for a motor vehicle comprises an armrest body configured to couple to a fixing mechanism. The armrest body comprises axle pins and stop pins. The fixing mechanism comprises a pivot bearing and a stop groove. The axle pins are configured to insert into the pivot bearings and pivot about an axis of rotation. The distance between the stop pins is smaller than the distance between the pivot bearings.

In another exemplary embodiment, a method for installing an armrest into a vehicle through a plurality of installation positions comprises: providing an armrest body configured to fit into the vehicle; and providing coplanar axle pins and stop pins coupled to the armrest body. The axel pins are attached by a first connecting member and the stop pins are attached by a second connecting member. The first and second connecting members are of different lengths. The method further comprises aligning the plane of the axle pins and stop pins with the vehicle; and inserting the axle pins and stop pins into the vehicle in any of a plurality of installation positions.

In another exemplary embodiment, a vehicle armrest comprises an armrest body having an axel pin and a stop pin. A fixing mechanism is configured to receive the axel pin at a first location and further configured to receive the stop pin at a second location. A spring is coupled to the fixing mechanism, the spring configured to bias the axle pin against the fixed mechanism when the axel pin is received by the fixed mechanism. The axel pin is linearly restrained with respect to the fixing mechanism and the stop pin is configured to rotate with respect to the fixing mechanism about the first location. The fixing mechanism is configured to so that the second location is shallower, with respect to the fixing mechanism, than the first location and so that the stop pin and axel pin may be received by the fixing mechanism in a plurality of installation positions.

In yet another exemplary embodiment, a vehicle armrest comprises an armrest body having at least two axel pins and at least two stop pins. The at least two axel pins are coupled together via a first connecting member and the stop pins are coupled via a second connecting member. A spring is configured to bias the axel pins against a fixed mechanism when the axel pins are received by the fixed mechanism. The axel pins are linearly restrained with respect to the fixing mechanism and the stop pins are configured to rotate with respect to the fixing mechanism. The first connecting member is longer than the second connecting member so that the stop pins may and the axel pins be received by the fixing mechanism in a plurality of installation positions.

Accordingly, provided with the present armrest is an armrest body and a fixing mechanism. The armrest body includes an axle pin and a stop pin on both sides. The fixing mechanism includes a pivot bearing and a stop groove on both sides. The axle pins are insertable into the pivot bearings and are pivotable about an axis of rotation. The extent (or span) of the stop pins in the direction of the axis of rotation is smaller than the distance between the pivot bearings thereby enabling the stop pins to be installed into the fixing mechanism without being obstructed by the fixing mechanism or pivot bearings. This provides for a more consistent assembly during installation of the armrest and therefore reduces the overall costs.

In one embodiment, the armrest body has a range (or plurality) of possible installation positions, in which a plane formed by the axle pins and the stop pin is a predetermined maximum position within the angular range. This simplifies the installation of the armrest on the fixing mechanism, avoids possibilities of error during installation and therefore makes the armrest overall more cost-effective.

In another embodiment is the angular range is approximately 15° to approximately 50°, or approximately 20° to approximately 40°, or approximately 25° to approximately 35°. This simplifies the installation of the armrest in a particular manner and therefore makes it more cost-effective because the armrest or the armrest body can be fitted into the vehicle in different positions.

In another embodiment the stop pins are essentially parallel to the axle pins thereby enabling installation of the pivotably mounted armrest in the fixing mechanism in a particularly simple and cost-effective manner.

In another embodiment, the stop pins are formed by a single-piece (or uniform) stop pin part and/or the axle pins are formed by a single-piece (or uniform) axle pin part. The axle pins and stop pins are connected by a continuous tube. A tube of this type or a profile of this type is provided in particular as a metal tube or as a metal profile.

In one embodiment, the ends of the axle pins each have first caps and/or the ends of the stop pins each have second caps. The first and/or second caps each have a channel. This enables the armrest to be readily guided and readily mounted on the fixing mechanism. The caps are produced by means of a material optimized specifically for mounting and guiding, e.g., a plastic. This material reduces noise and contact friction which may occur during movement of the armrest or of the entire body in relation to the fixing mechanism. The caps may be produced from a polyacetal plastic as this material is particularly low in friction and causes little noise.

In another embodiment, the securing means (or member) is configured to secure the axle pin to the pivot bearing. This makes it possible in a simple manner for the armrest body to be fastened in a secure manner in the fixing mechanism thereby preventing the armrest from being removed or hurled out, e.g., in the event of an accident when the armrest experiences very high accelerations.

In one embodiment, the securing means is fastened to the fixing mechanism. This enables the securing means to be connected to the fixing mechanism pre-installation.

The securing means is preferably a spring and in particular a leaf (or wire) spring. The securing means is radially deflectable. In one embodiment, the spring is guided through one or more openings of the fixing mechanism and, by means of its shaping and the shaping of the fixing mechanism, is pre-stressed to secure the axel pin(s) to the fixing mechanism. When the axle pin is placed into the pivot bearing, a wire spring is preferably deflected in a plane perpendicular to the axis of rotation, i.e. radially.

Provided is also a method for installing an armrest having an armrest body being fitted to a fixing mechanism. The armrest body has a respective axle pin and a stop pin on both sides. The fixing mechanism has a respective pivot bearing and a stop groove on both sides. The axle pins are insertable into the pivot bearings and then mounted pivotably. Installation of the armrest body is possible in a plurality of installation positions in which a plane formed by the axle pins and the stop pins are held in a predetermined maximum angular range. The armrest body can be fitted in a particularly simple manner in the fixing mechanism and, as a result, the installation of the entire armrest is simplified and rendered less expensive.

BRIEF DESCRIPTION OF THE DRAWINGS

The invention is explained in more detail below with reference to exemplary embodiments illustrated in the drawing.

FIG. 2a schematically illustrates the fixing mechanism according to one exemplary embodiment.

FIG. 2b schematically illustrates a side view of the fixing mechanism according to one exemplary embodiment.

DETAILED DESCRIPTION

Figure 1:
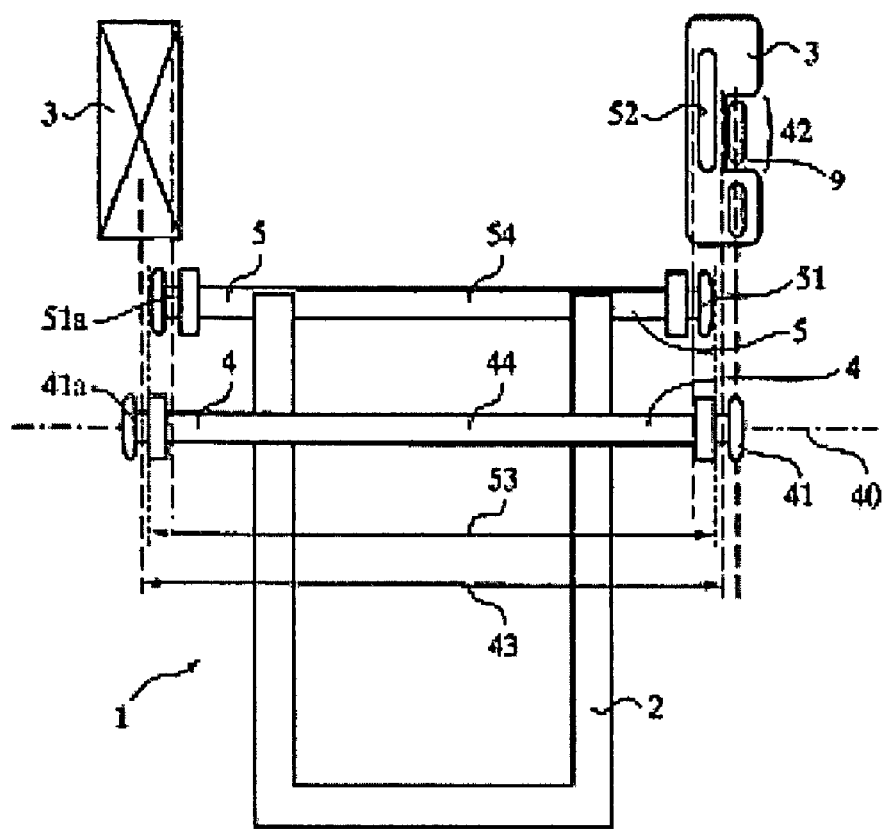
FIG. 1 schematically illustrates an armrest according to one exemplary embodiment.

FIG. 1 illustrates an armrest 1 according to one exemplary embodiment. The armrest 1 comprises an armrest body 2, the armrest body 2 generally has an upholstery. The armrest body 2 is formed essentially by a frame which stabilizes the armrest body 2. According to the invention, the frame of the armrest body 2 is a metal frame formed in a U-shaped manner. In the illustrated exemplary embodiment, the open end of the frame is bent in a U-shaped manner and oriented towards the backrest (i.e. toward the axle pin). The armrest body 2 may also be composed of plastic such as a polycarbonate plastic (e.g., an unreinforced ABS-PC blend). The armrest body 2 may furthermore include receiving compartments, covers and/or beverage holders.

The armrest body 2 is connected to an axle pin 4 arranged on both sides and to a stop pin 5 likewise arranged on both sides. The pins 4, 5 are connected by continuous metal tubes or (connecting members). Metal tube 44 connects the axle pins 4, while metal tub 45 connects the stop pins 5. In an alternative exemplary embodiment, the pins 4, 5 are fitted on both sides of the armrest body 2 without a continuous connection. In this case, the metal tubes 44 and 54 may be referred to as axle pin part 44 and stop pin part 54.

The ends of the pins 4, 5 are provided with caps placed thereto. The first caps 41 are placed onto the axle pins 4 and the second caps 51 are placed onto the stop pins 5. The caps 41, 51 each have a groove 41a, 51a.

The fixing mechanism 3 of the armrest 1 includes a pivot bearing 42 and a stop groove 52. The pivot bearing 42 mounts the axle pin 4 in a manner so that the armrest body 2 may be fastened rotatably or pivotably in the fixing mechanism. The stop groove 52 forms a stop for the stop pins 5 which rotates during movement of the armrest body 2 about the axis of rotation 40. The stop groove 52 limits the rotation of the armrest body 2.

The armrest body 2 is smaller than the distance 43 between the pivot bearings 42 of the fixing mechanism 3. The length 53 of the stop pins 5 is smaller than the width between the pivot bearings 42. Therefore, the armrest body 2 with the stop pins 5 can be guided between the pivot bearing 42 without interference. The width of the pivot bearing 42 is larger than the length 53 of the stop pins 5 (in a direction parallel to the axis of rotation 40) as shown in FIG. 1. The armrest body 2 is arranged between two symmetrical parts of the fixing mechanism 3. Each fixing mechanism includes a pivot bearing 42 and correspondingly supports one side of the armrest body 2. A corresponding, symmetrical configuration is also provided for the left side of the fixing mechanism 3. In an alternative exemplary embodiment, a single-piece fixing mechanism 3—as an alternative to the two-piece design—is utilized. In one exemplary embodiment, two side parts of the single-piece fixing mechanism 3 are connected to a central piece so that the fixing mechanism 3 is overall U-shape.

The fixing mechanism 3 includes the pivot bearing 42 in which an axle pin 4 is arranged therein. The diameter of the channel 41a of the first cap 41 is illustrated in FIG. 2b. The axle pin 4 is restrained by a spring 9 (or a securing means). The spring 9 engages the first cap 41 situated on the axle pin 4 tangentially (i.e., along at least a partial region of its circumference). The spring 9 exerts a force (radially) in such a manner that the spring 9 can deflect or deform downward in order to allow the axle pin 4 or the first cap 41 to snap into place. The fixing mechanism 3 and spring 9 are preferably composed of a material configured to prevent springing back.

The spring 9 is a leaf or wire spring and is guided through the fixing mechanism 3 at a first aperture point 9a or a first spring opening 9a and at a second aperture point 9b or at a second spring opening 9b. A relatively narrow curvature of the spring 9 permits it to snap into the material of the fixing mechanism 3. The spring 9 can be prestressed to secure the axle pin 4 in the pivot bearing 42.

Furthermore, the fixing mechanism 3 has a stop groove 52 within which the stop pin 5 of the armrest 1 can move when the axle pin 4 is fastened rotatably in the pivot bearing 42. The stop pin 5 or the second cap 51 on the stop pin 5 is restricted at a first stop end 52a and at a second stop end 52b of the stop groove 52. The first stop end 52a corresponds to an operative position of the armrest 1 and the second stop end 52b corresponding to an inoperative position of the armrest 1 (or a setting of the armrest 1 in which it is folded over upward). The stop groove 52 defines a rotational region 50 for the armrest body 2 to fit into the fixing mechanism 3.

During the installation of the armrest body 2, the axle pin 4 fitting into the pivot bearing 42, and of the stop pin 5 into the stop groove 52, the armrest body 2 has to be situated in a certain range of a plurality of installation positions. FIG. 2b illustrates the range of the plurality of angular positions 33 in which the plane 45 defined by the axle pin 4 and the stop pin 5 must be in so that the armrest body 2 can still be coupled to the fixing mechanism 3. The fixing mechanism 3 has a first plane 31 (illustrated in FIG. 2a) in which the fastening of the axle pin 4 is provided. The fixing mechanism 3 furthermore has a second plane 32 in which the stop groove 52 is situated. The fixing mechanism 3 continues from its first plane 31 into its second plane 32 and vice versa in a first fixing region 36 and into a second fixing region 37. The fixing mechanism 3 is configured to ensure that the stop pin 5 can slide past the first fixing region 36 into the stop groove 52 during installation, i.e., the fixing mechanism 3 is configured to so that the second plane 32 (or location) is shallower, with respect to the fixing mechanism, than the first plane 31 (or location) and so that the stop pin 5 and axel pin 4 may be received by the fixing mechanism in a plurality of installation positions. The fixing mechanism can be configured so that the maximum angular range 33 is approximately 15° to 60° or 20° to 40° or 25° to 35°.

The first groove 41a has a width so that the fixing mechanism 3, in the region of the pivot bearing 42, can engage in the first groove 41a. The axle pin 4 is also somewhat locked in the axial direction by the formation of the groove 41a. Correspondingly, the groove 51a of the second cap 51 engages the fixing mechanism 3 in the region of the stop groove 52. This guides the stop pin 5 by the stop groove 52 over the entire region of movement 50.

The invention claimed is:

1. An armrest for a motor vehicle, comprising:
    an armrest body configured to be coupled to a fixing mechanism, the armrest body comprising an axle pin and a stop pin on both a first side of the armrest and on a second side of the armrest;
    wherein the fixing mechanism comprises a pivot bearing and a stop groove on both the first side of the armrest and on the second side of the armrest, wherein the axle pins are configured to be inserted into the respective pivot bearings and pivot about an axis of rotation; and
    wherein a distance between an end of the stop pin on the first side of the armrest and an end of the stop pin on the second side of the armrest in a direction of the axis of rotation is smaller than a distance between the pivot bearing on the first side of the armrest and the pivot bearing on the second side of the armrest.

2. The armrest of claim 1, wherein the armrest body may be installed in the fixing mechanism in a plurality of angular positions, and wherein the axle pins and stop pins form a plane, and wherein the fixing mechanism and the plane define a maximum angular position in the plurality of angular positions in which the armrest body may be installed in the fixing mechanism.

3. The armrest of claim 2, wherein the plurality of angular positions for installing the armrest body into the fixing mechanism comprises a 35 degree range.

4. The armrest of claim 1, wherein the stop pins are configured parallel to the axle pins.

5. The armrest of claim 1, wherein any one of the stop pins and the axle pins comprise a uniform part.

6. The armrest of claim 1, wherein the axle pins define a channel therein and comprise a cap at the end of the axle pins.

7. The armrest of claim 1, wherein the fixing member further comprises a securing member for securing the axle pins with respect to the pivot bearing.

8. The armrest of claim 7, wherein the securing member is fastened to the fixing mechanism.

9. The armrest of claim 7, wherein the securing member is a leaf spring and configured to deform radially with respect to the fixing mechanism for securing the axle pins thereto.

10. A method for installing an armrest into a vehicle through a plurality of installation positions, comprises:
    providing an armrest body configured to fit into the vehicle;
    providing coplanar axle pins and stop pins coupled to the armrest body, the axle pins attached by a first connecting member and the stop pins attached by a second connecting member, wherein the first and second connecting members are of different lengths;
    aligning a plane formed by the axle pins and stop pins with the vehicle; and
    inserting the axle pins and stop pins into the vehicle in any of a plurality of installation positions.

11. A vehicle armrest, comprising:
    an armrest body comprising an axle pin and a stop pin;
    a fixing mechanism configured to receive the axle pin at a first location and further configured to receive the stop pin at a second location;
    a spring coupled to the fixing mechanism, the spring configured to bias the axle pin against the fixed mechanism when the axle pin is received by the fixed mechanism;
    wherein the axle pin is linearly restrained with respect to the fixing mechanism and the stop pin is configured to rotate with respect to the fixing mechanism about the first location; and
    wherein the fixing mechanism is configured so that the second location is shallower, with respect to the fixing mechanism, than the first location and so that the stop pin and axle pin may be received by the fixing mechanism in a plurality of installation positions.

12. The armrest of claim 11, wherein the fixing mechanism further comprises pivot bearings at the first location configured to receive the axle pin.

13. The armrest of claim 11, wherein the fixing mechanism defines a cavity comprising the second location therein and wherein the cavity is configured so that the stop pin may rotate therein.

14. A vehicle armrest, comprising:
    an armrest body comprising at least two axle pins and at least two stop pins, wherein the at least two axle pins are coupled via a first connecting member, and wherein the at least two stop pins are coupled via a second connecting member;
    a spring configured to bias the axle pins against a fixed mechanism when the pins are received by the fixed mechanism;
    wherein the axle pins are linearly restrained with respect to the fixing mechanism and the stop pins are configured to rotate with respect to the fixing mechanism; and
    wherein the first connecting member is longer than the second connecting member so that the stop pins and the axle pins may be received by the fixing mechanism in a plurality of installation positions.

* * * * *